United States Patent [19]

Suzaki et al.

[11] Patent Number: 4,687,132
[45] Date of Patent: Aug. 18, 1987

[54] ENGINE COOLING FAN COUPLING SYSTEM CONTROLLED IN CONCERT WITH A COOLING SYSTEM THERMOSTAT

[75] Inventors: Shunkichi Suzaki; Toshiaki Shirai; Hisanobu Adachi, all of Toyota; Masaharu Hayashi, Kariya; Kenji Hattori, Kariya; Yoshinari Takakura, Kariya, all of Japan

[73] Assignees: Toyota Jidosha Kabushiki Kaisha, Toyota; Aisin Seiki Kabushiki Kaisha, Kariya, both of Japan

[21] Appl. No.: 849,954

[22] Filed: Apr. 9, 1986

[30] Foreign Application Priority Data

Apr. 12, 1985 [JP] Japan .............................. 60-54672[U]

[51] Int. Cl.$^4$ ............................................. F16D 35/00
[52] U.S. Cl. .................................... 236/35; 123/41.12
[58] Field of Search ...................... 236/35; 123/41.12; 192/82 T

[56] References Cited

U.S. PATENT DOCUMENTS

| | | | |
|---|---|---|---|
| 2,838,244 | 6/1958 | Oldberg | 236/35 |
| 3,323,623 | 6/1967 | Roper | 236/35 X |
| 3,858,697 | 1/1975 | Brewer et al. | 123/41.12 X |
| 4,223,646 | 9/1980 | Kinder | 236/35 X |
| 4,351,425 | 9/1982 | Bopp | 123/41.12 X |
| 4,351,426 | 9/1982 | Bopp | 123/41.12 X |
| 4,487,255 | 12/1984 | Bianchetta et al. | 236/35 X |
| 4,550,695 | 11/1985 | Kikuchi et al. | 123/41.12 |

Primary Examiner—William E. Tapolcai
Attorney, Agent, or Firm—Oblon, Fisher, Spivak, McClelland & Maier

[57] ABSTRACT

An automotive vehicle engine having a coolant circulation system with a radiator, a fan, and a thermostatic valve for controlling coolant flow through the radiator. This thermostatic valve starts to open at a first temperature, is fully opened at a second temperature, and is partly opened at an intermediate third temperature. A system for coupling the fan to a rotation engine member includes: a first member rotationally coupled to the rotating member; a second member rotationally coupled to the fan; and a mechanism for providing rotational coupling between the first and second members. The degree of rotational coupling is lower when a first control valve is closed than opened, and is lower when a second control valve is closed than opened. The first control valve is opened when and only when the temperature of air passing the radiator is greater than a determinate temperature; and the second control valve is opened when engine coolant temperature rises from below to above a fourth temperature, while being closed when it drops from above to below a fifth temperature substantially lower than the fourth temperature. The fourth and fifth temperatures are substantially higher than the third temperature, differing therefrom respectively by first and second temperature differences, the second of which is substantially less than the first and the fifth temperature is higher than the second temperature.

3 Claims, 3 Drawing Figures

1

ENGINE COOLING FAN COUPLING SYSTEM CONTROLLED IN CONCERT WITH A COOLING SYSTEM THERMOSTAT

BACKGROUND OF THE INVENTION

1. Field of the Invention

The present invention relates to a system for coupling a cooling fan of an internal combustion engine to a rotating member thereof such as a crank shaft, and more particularly relates to such a system in which the degree of rotational coupling between said cooling fan and said crank shaft is varied over three stages to respond to the cooling requirements for the engine, according to the temperature of the engine coolant and of the air passing through the engine radiator.

2. Description of the Prior Art

Various types of system for coupling an engine cooling fan to the engine crank shaft have been proposed. In particular, in Japanese Patent Applications Serial Nos. 59-18226 (1984) and 59-201379 (1984), neither of which is intended to admit as prior art to the present patent application except to the extent otherwise required by applicable law, applicant being the same as the assignee or entity owed a duty of assignment of the present patent application and which discloses a cooling fan fluid coupling system comprising a fluid circuit which is coupled to a member driven by the engine crank shaft to a member which drives the cooling fan, the amount of fluid circulation in said fluid circuit, which determines the degree of coupling provided by said fluid coupling system, being determined according to the opening amount of a first control valve and also according to the opening amount of a second control valve. The first control valve was controlled by a first actuator which was responsive to the temperature of the air passing through the vehicle radiator to cool it, and which incorporated a bimetallic spiral element or the like; while the second control valve was controlled by a second actuator which was responsive to the temperature of the coolant of the engine, and which incorporated a thermowax element or the like. Thereby, the amount of fluid circulation in the fluid circuit, which determined the degree of coupling provided by the fluid coupling system and hence for a given engine revolution speed the rotational speed of the fan and the amount of air sucked thereby through the radiator, was varied over three steps or stages, i.e. between low, medium, and high, according to the temperature of the air passing through said radiator and according to the temperature of the engine coolant.

In such engine cooling fan coupling system the control of switching over of the degree of coupling provided by said fluid coupling system is carried out in response to the temperature of the engine coolant and additionally in response to the temperature of the air passing through the radiator, so that the rotational speed of the fan better corresponds to the amount of cooling required for the engine, as compared to the conventional form of cooling fan coupling system in which the cooling fan is directly driven from the engine crank shaft, and even as compared to a form of cooling fan coupling system in which the control of switching over of the degree of coupling provided by the fluid coupling system is carried out in response only to the temperature of the engine coolant and not in response to the temperature of the air passing through the radiator. Nevertheless some problems still arise in practice. Specifically, since in such concept there is no particular coordination between the operation of a thermostatic valve which is typically fitted to the engine cooling system for controlling the flow of coolant therethrough and through the radiator, and the operation of the engine cooling fan coupling system, on occasion the engine cooling will not be properly carried out. As an example, if the temperature at which the above mentioned second control valve opens is set at a value considerably higher than the temperature at which the thermostatic valve opens, then the necessary cooling fan speed will not be attained, due to the excessive width of the domain over which said second control valve remains closed, and accordingly the coolant may reach an undesirably high temperature. If the temperature at which said second control valve closes is set at a value lower than the temperature at which said thermostatic valve is open, the second control valve, once open, will remain in the open condition without closing, even in an operational domain in which coolant temperature regulation is not specifically required, and accordingly the engine cooling fan will be operated at a high rotational speed unnecessarily, thus reducing engine power with no purpose, as well as increasing engine fuel consumption and cooling fan noise.

SUMMARY OF THE INVENTION

Accordingly, it is the primary object of the present invention to provide an engine cooling fan coupling system which avoids the above described problems.

It is a further object of the present invention to provide such an engine cooling fan coupling system which properly operates the cooling fan to provide an appropriate amount of cooling in all operational conditions of the engine.

It is a yet further object of the present invention to provide such an engine cooling fan coupling system which does not drive the cooling fan more than is required.

It is a yet further object of the present invention to provide such an engine cooling fan coupling system which when high cooling effect is required for the engine unequivocally activates the cooling fan at a high rotational speed.

It is a yet further object of the present invention to provide such an engine cooling fan coupling system which maximizes engine output power.

It is a yet further object of the present invention to provide such an engine cooling fan coupling system which maximizes engine fuel consumption.

It is a yet further object of the present invention to provide such an engine cooling fan coupling system which minimizes cooling fan noise.

According to the most general aspect of the present invention, these and other objects are accomplished by a cooling fan coupling system for an engine for an automotive vehicle, said engine comprising a rotating member and a coolant circulation system comprising a coolant radiator, a cooling fan for propelling air past said radiator to cool said coolant radiator, and a thermostatic valve for controlling the flow of coolant through said coolant radiator, said thermostatic valve being constituted to start to open at a first determinate coolant temperature value, to be fully opened at a second determinate coolant temperature value, and to be partly opened at a third determinate coolant temperature value which is intermediate said first determinate coolant temperature value and said second determinate coolant temperature value, said cooling fan coupling system comprising: (a) a first member rotationally coupled to said rotating member of said engine; (b) a second member rotationally coupled to said cooling fan; (c) means for providing rotational coupling between said first member and said second member, the degree of said rotational coupling being lower when a first control valve is closed and greater when said first control valve is opened, and also being lower when a second control valve is closed and greater when said second control valve is opened; (d) means for opening said first control valve when the temperature of the air which is passing said radiator is greater than a determinate air temperature value, and for closing said first control valve when the temperature of the air which is passing said radiator is greater than said determinate air temperature value; and: (e) means for opening said second control valve when engine coolant temperature rises from below a fourth determinate coolant temperature value to above said fourth determinate coolant temperature value, and for closing said second control valve when engine coolant temperature drops from above a fifth determinate coolant temperature value to below said fifth determinate coolant temperature value, said fifth determinate coolant temperature value being substantially lower than said fourth determinate coolant temperature value; (f) said fourth and fifth determinate coolant temperature values being substantially higher than said third determinate coolant temperature value, said fourth determinate coolant temperature value differing from said third determinate coolant temperature value by a first determinate temperature difference, and said fifth determinate coolant temperature value differing from said third determinate coolant temperature value by a second determinate temperature difference; and (g) said first determinate temperature difference being substantially greater than said second determinate temperature difference.

According to the present invention as described above, the domains in which said second control valve for controlling the engine cooling fan is set to be open and closed are appropriately set according to and in view of the functional characteristics of the thermostatic valve for control of the engine coolant flow. Accordingly, driving of the cooling fan is appropriately carried out at all times and in all engine operational conditions, in response to the engine coolant temperature and in response to the temperature of the air flowing through the engine radiator, without causing any excess or deficiency of engine cooling. Thus, while when high cooling effect is required for the engine the engine cooling fan coupling system unequivocally activates the cooling fan at a high rotational speed, on the other hand such system does not drive the cooling fan more than is required. Accordingly, this engine cooling fan coupling system maximizes engine output power and engine fuel consumption, while minimizing cooling fan noise.

BRIEF DESCRIPTION OF THE DRAWINGS

The present invention will now be shown and described with regard to certain of the preferred embodiments thereof, and with reference to the illustrative drawings, which however should not be considered as limitative of the present invention in any way, since the scope of the present invention is to be considered as being delimited solely by the accompanying claims, rather than by any particular features of the disclosed embodiments or of the drawings. In these drawings:

DESCRIPTION OF THE PREFERRED EMBODIMENT

Figure 1:
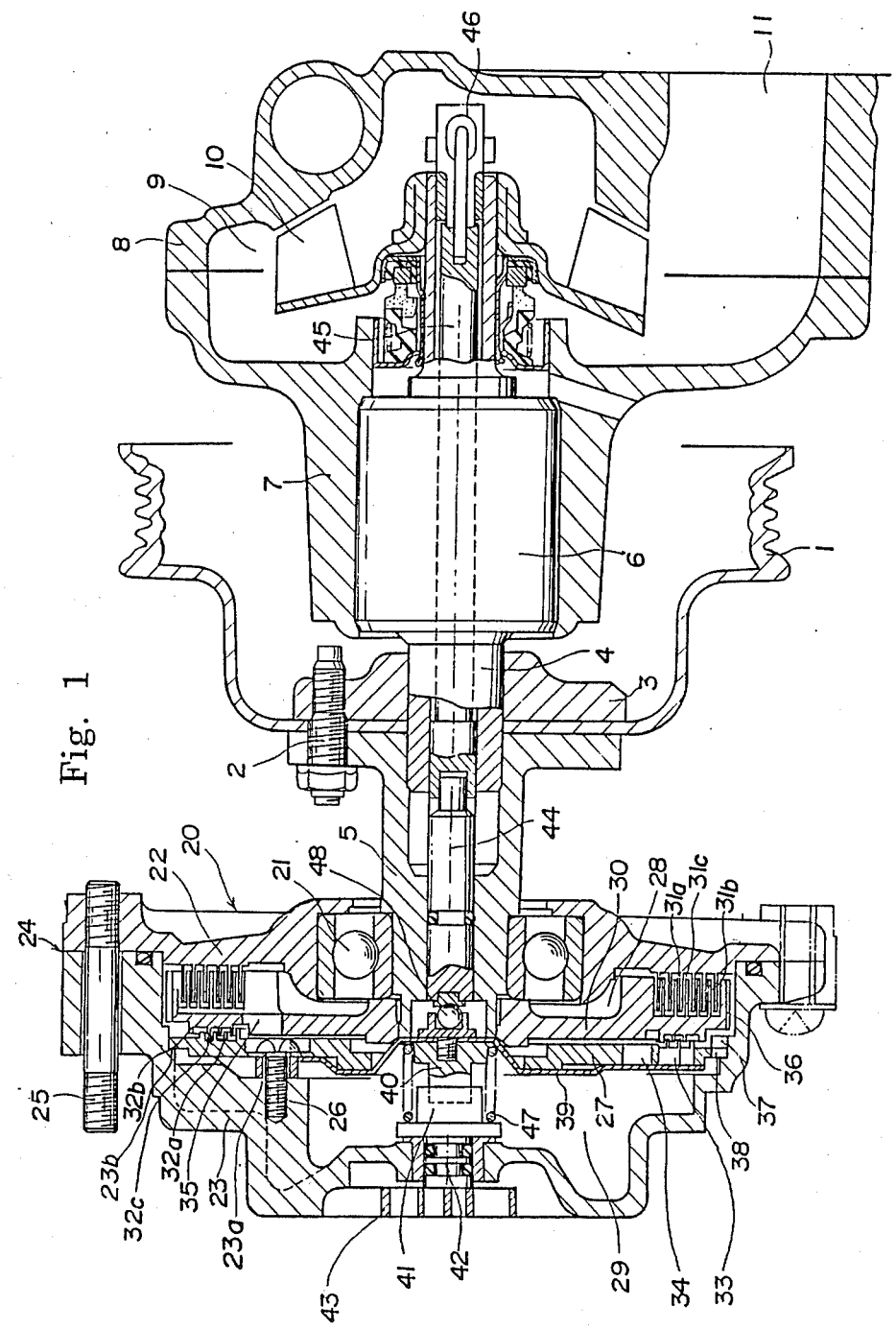
FIG. 1 is a longitudinal cross sectional view of the preferred embodiment of the cooling fan coupling system of the present invention, also showing a coolant pump and a fan belt pulley and other equipped devices of an automotive vehicle internal combustion engine to which said preferred embodiment cooling fan coupling system is fitted.

The present invention will now be described with reference to the preferred embodiment thereof. FIG. 1 shows in longitudinal cross section the preferred embodiment of the cooling fan coupling system of the present invention, which is fitted to a coolant pump and fan belt pulley, etc., of an automotive vehicle internal combustion engine not particularly itself shown as a whole in the figures. In this figure, reference numeral 1 denotes a pulley which is rotationally driven by a fan belt (not shown), which is looped round said driven pulley 1 and also round a driving pulley on a crank shaft (not shown) of the internal combustion engine. This pulley 1 is fixed and drivingly coupled by a bolt 2 (i.e. several such bolts 2 being provided but only one being visible in the figure) to a pulley hub 3, which itself is drivingly coupled to a coolant pump driving shaft 4 which extends from the one side of said pulley hub 3, and also to a cooling fan driving shaft 5 which extends from the other side of said pulley hub 3 and is clamped to said pulley hub 3 by said bolts 2.

A coolant pump housing 8 is fixedly attached to a block (not shown) of the internal combustion engine, and a pump cover 7 is fixedly attached to said coolant pump housing 8. This pump cover 7, via a bearing 6, rotatably supports the cooling fan driving shaft 5 and thereby also the pulley 1, the pulley hub 3, and the coolant pump driving shaft 4. A pump chamber 9 is defined between the pump cover 7 and the coolant pump housing 8. A centrifugal fan 10 is fixedly mounted on the inner end of the coolant pump driving shaft 4, within said pump chamber 9, and when rotated by said coolant pump driving shaft 4 functions as a centrifugal pump for the coolant fluid of the engine, said coolant fluid being sucked into the pump chamber 9 through a coolant fluid inlet (not shown) and being expelled from said pump chamber 9 after being pressurized through a coolant fluid outlet 11.

The cooling fan driving shaft 5 functions as a rotational power input shaft for a cooling fan coupling system 20 which is the preferred embodiment of the cooling fan coupling system of the present invention. In detail, a casing assembly 24 of this cooling fan coupling system comprises a coupling back plate 22 which is substantially freely rotatably mounted on the end of said cooling fan driving shaft 5 via a ball bearing 21, a coupling housing cover 23 which is fitted against said back plate 22 with a certain interior space being defined between them, and a plurality of bolts 25 (only one of said bolts 25 being seen in the drawing) which clamp together said housing cover 23 and said back plate 22 and also clamp to them a cooling fan (not shown) for the internal combustion engine, said cooling fan being so positioned that when said cooling fan is rotated by the casing assembly 24 it sucks a flow of cooling air through a radiator (not shown) of said engine, said radiator being provided with a flow of hot coolant from the engine in a per se known maner by the coolant pump constituted by the centrifugal fan 10, etc. as described above.

This internal space defined between the coupling housing cover 23 and the back plate 22 is basically cylindrical in shape with two annular steps 23a and 23b being defined on the inner circumferential surface of said coupling housing cover 23, and a disk shaped partition plate 27 is secured against the larger one 23b of these steps by a plurality of bolts 26, only one of which can be seen in the figure. Thus, this partition plate 27 divides the space in the casing assembly 24 into a coupling operation chamber 28 defined on the right side of said partition plate 27 in FIG. 1 and a fluid reservoir chamber 29 defined on the left side of said partition plate 27 in said figure. These chambers 28 and 29 are both filled with an appropriate working fluid such as silicone oil or the like which has an appropriate viscosity.

In the coupling operation chamber 28 defined on the right side of the partition plate 27, there is housed a rotor 30 which is fixedly attached on the left end in the figure of the cooling fan driving shaft 5 and therefore rotates within said coupling operation chamber 28 when the casing assembly 24 rotates on the bearing 21 with respect to said cooling fan driving shaft 5. The right side in the figure of said rotor 30 is formed with a set of rightwardly longitudinally projecting and circumferentially extending vanes 31b which are interleaved alternately with a set of leftwardly longitudinally projecting and circumferentially extending vanes 31a provided on the left side in the figure of the back plate 22, these vanes 31a and 31b thereby defining a first labyrinthine passage 31c between them. Similarly, the left side in the figure of said rotor 30 is formed with a set of leftwardly longitudinally projecting and circumferentially extending vanes 32b which are interleaved alternately with a set of rightwardly longitudinally projecting and circumferentially extending vanes 32a provided on the right side in the figure of the partition plate 27, these vanes 32a and 32b thereby defining a second labyrinthine passage 32c between them. Between the two sides of, and through, the rotor 30 there is formed a transfer hole 35 which is relatively large in cross sectional area; thereby, a plenitude of working fluid such as silicone oil is transferred between the two chamber portions defined on the left and the right of said rotor 30, when required. The coupling operation chamber 28 and the fluid reservoir chamber 29 are communicated together through the partition plate 27 by three apertures, as can be particularly seen in the FIG. 2 partial view of said partition plate 27, as follows: a first valve port 33 opens through said partition plate 27 at a radial position thereon near but not at the periphery thereof; a second valve port 34 opens through said partition plate 27 at a radial position thereon somewhat closer to the center thereof than said first valve port 33 and somewhat circumferentially displaced from said first valve port 33; and a return port 38 opens through said partition plate 27 at a position on the periphery of said partition plate 27. A pump notch 36 (i.e. a plurality thereof) is provided on the outer peripheral surface of the rotor 30, while a pump boss 37 is provided on the coupling housing cover 23. The cooperation of these shapes, when the rotor 30 is rotating within the coupling operation chamber 28, tends if possible to such working fluid (silicone oil) through either or both of the first and second valve ports 33 and 34 which may be open into said coupling operation chamber 28, said working fluid then being circulated in said coupling operation chamber 28 through the first and second labryrinthine passages 31c and 32c to provide rotational coupling between the rotor 30 and the assembly of the back plate 22 and the partition plate 27, and said working fluid being finally ejected from said coupling operation chamber 28 through the return port 38. These first and second valve ports 33 and 34 are both controlled by a single valve element 39 which is of a generally flat plate like shape, mounted within the fluid reservoir chamber 29 and held straight therein by cooperation with bosses of the bolts 26 previously mentioned and also by the effect of a compression coil spring 47 which biases and valve element 39 rightward in FIG. 1 agains the partition plate 27. In more detail, valve element 39 is formed rather as a flattened blade and is movable with two degrees of freedom: said valve element 39 can rotate about the same rotational axis as that of the casing assembly 24, etc, and can also be moved in the longitudinal direction of said rotational axis. When said valve element 39 is pressing against the surface of the partition plate 27, then whatever be its rotational position (within its range of rotational movement which is limited as will be described shortly) it definitely substantially completely closes the second valve port 34, while on the other hand according to its rotational position said valve element 39 opens the first valve port 33 to a greater or a lesser extent; this being graphically shown in FIG. 2 by the solid lines showing a position denoted as "A" of said valve element 39 and by the phantom lines showing a position denoted as "B" of said valve element 39. On the other hand, when said valve element 39 is moved away from the surface of the partition plate 27 in the leftward direction in FIG. 1 by a means which also will be described shortly, then said valve element 39 definitely and positively opens both said first valve port 33 and also said second valve port 34.

With regard to the control of the rotational position of the valve element 39, said valve element 39 is connected via mutually jointed link element 40 and 41 (around which the previously mentioned compression coil spring 47 is fitted) to a hub 42 which is in turn connected to the inside end of a coiled bimetallic spiral strip 43, the outer end of which is connected to the coupling housing cover 23, in which said hub 42 is freely rotatably mounted. The link elements 40 and 41 can slide longitudinally with respect to one another but are constrained by their construction (not particularly shown) to rotate together. Thus, the valve element 39 is positioned with regard to its rotational position by the action of the bimetallic spiral strip 43, i.e. according to the temperature of said bimetallic spiral strip 43 which is substantially the same as that of the air impinging on said spiral strip 43 which has just passed through the vehicle radiator (not shown), while on the other hand the axial position of said valve element 39 is not substantially constrained by the above described construction.

Figure 2:
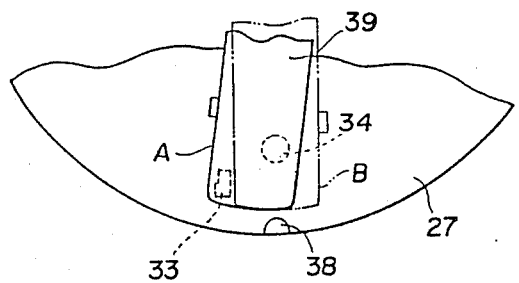
FIG. 2 is a frontal view of a valve apparatus incorporated in said preferred embodiment cooling fan coupling system.

The bimetallic spiral strip 43 is so constructed that, when the temperature of the air flowing through the radiator and impinging on said bimetallic spiral strip 43 is lower than a first determinate air temperature value, for example 55° C., said bimetallic spiral strip 43 rotationally positions the valve element 39 to its position shown as "A" in FIG. 2, so as substantially completely to close the first valve port 33; when the temperature of the air flowing through the radiator and impinging on said bimetallic spiral strip 43 is greater than a second determinate air temperature value, for example 60° C., said bimetallic spiral strip 43 rotationally positions the valve element 39 to its position shown as "B" in FIG. 2, so as substantially completely to open said first valve port 33; and, when the temperature of the air flowing through the radiator and impinging on said bimetallic spiral strip 43 is greater than said first determinate air temperature value and is lower than said second determinate air temperature value, i.e. in this example is between 55° C. and 60° C., said bimetallic spiral strip 43 rotationally positions the valve element 39 to an intermediate position between its positions shown as "A" and "B" in FIG. 2, so as only partially to open said first valve port 33.

With regard to the control of the axial position of the valve element 39, the coolant pump driving shaft 4, the pulley hub 3, and the cooling fan driving shaft 5 are all hollow, and a thermal actuator 46 is provided as fitted into the end of said coolant pump driving shaft 4 and as located within the pump chamber 9. Thus, this thermal actuator 46 is responsive to the temperature of the coolant being pumped by the centrifugal coolant pump system, described above, housed within said pump chamber 9. The thermal actuator 46 may be a per se known type of thermowax actuator, and its output signal is a linear motion of an actuator member thereof which is abutted to one end of a first thrust rod 45 slidably housed within the coolant pump driving shaft 4. The other end of said first thrust rod 45 is abutted to one end of a second thrust rod 44 housed within the cooling fan driving shaft 5, the other end of said second thrust rod 44 being axially drivingly coupled, via a ball 48 which allows free rotational movement, to the valve element 39. Thereby, the thermal actuator 46 is coupled to said valve element 39 so as to drive it to and fro in the axial direction while so as not to affect its motion in the rotational direction, said rotational movement of said valve element 39 being controlled as described above by the bimetallic spiral strip 43.

Figure 3:
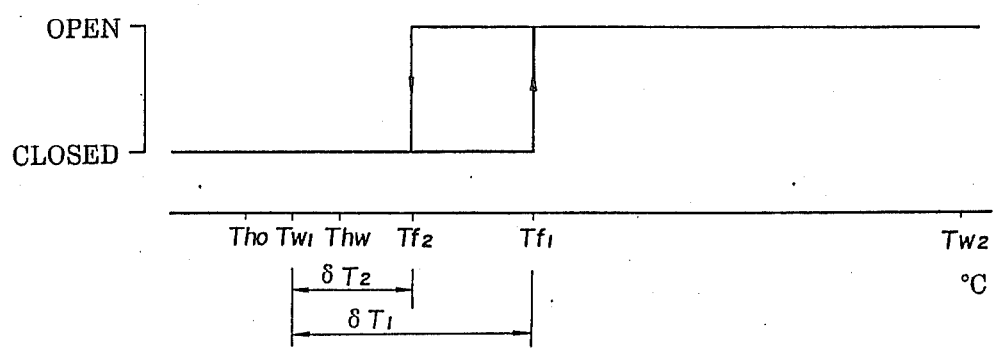
FIG. 3 is a graph in which engine temperature coolant is shown along the horizontal axis and degree of expansion of a coolant temperature responsive valve actuator is shown along the vertical axis, for explaining the operation of the present invention.

The thermal actuator 46 is so constructed that: when the temperature of the coolant flowing through the pump chamber 9 and impinging on said thermal actuator 46 is greater than a first determinate coolant temperature value, hereinafter called TF1° C. as shown in the graph of FIG. 3, said thermal actuator 46, in response to the expansion of the thermowax contained therein, expands and via the first and second thrust rods 45 and 44 pushes the valve element 39, against the resistance of the compression coil spring 47 which is overcome, to a position well removed from the partition plate 27, so as substantially completely to open both the first valve port 33 and the second valve port 34, irrespective of the rotational position of said valve element 39; when the temperature of the coolant flowing through the radiator and impinging on the said thermal actuator 46 is lower than a second determinate coolant temperature value, lower than said first determinate coolant temperature value and hereinafter denoted as TF2° C. as shown in the graph of FIG. 3, said thermal actuator 46, in response to the contraction of the thermowax contained therein, contracts and definitely ceases to push, via the first and second thrust rods 45 and 44, the valve element 39, and accordingly by the force of the compression coil spring 47 said valve element 39 is definitely pushed against the partition plate 27, so as substantially completely to close the second valve port 34 and so as to open or close the first valve port 33 by an amount determined according to the rotational position of said valve element 39 as described above; and, when the temperature of the coolant flowing through the radiator and impinging on said thermal actuator 46 is greater than said second determinate coolant temperature value Tf2° C. and is lower than said first determinate coolant temperature value Tf1° C., said thermal actuator 46 positions the valve element 39 according as to whether most recently stated coolant temperature was lower than said second determinate coolant temperature value Tf2° C. or was greater than said first determinate coolant temperature value Tf1° C., i.e. with a certain hysteresis effect, again as illustrated by the graph of FIG. 3.

In fact the internal combustion engine (not shown) to which this preferred embodiment of the cooling fan coupling system of the present invention is provided is also provided with a thermostatic coolant flow control valve (not shown) of a per se known sort for controlling flow of the coolant through its cooling system and indeed through the radiator (also not shown). The particular concept of the present invention is to set the determinate temperatures of operation of said cooling fan coupling system in concert with the critical switching temperatures of said thermostatic coolant flow control valve (hereinafter abbreviated to "coolant thermostat"), and thereby to obtain good concerted cooling control. In detail, in the FIG. 3 graph, the determinate temperature "Tho" is that temperature at which said coolant thermostat starts to open from the closed condition; the determinate temperature "Thw" is that temperature (higher than the temperature Tho) at which said coolant thermostat first becomes fully open when opening from the closed condition; and the temperature "Tw1" is a temperature intermediate between said determinate temperatures Tho and Thw, i.e. is a temperature at which said coolant thermostat is open to an intermediate extent when opening from the closed condition. Exemplarily, the determinate temperature Tho may be 88° C., the determinate temperature Thw may be 92° C., and the intermediate temperature Tw1 may be 90° C. According to the concept of the present invention, the first determinate coolant temperature value TF1 for the thermal actuator 46 is greater than said intermediate temperature Tw1 by a temperature difference amount δT1—exemplarily 10° C.—which is substantially larger than the temperature difference amount δT2—exemplarily 5° C.—by which the second determinate coolant temperature value TF2 for said thermal actuator 46 is greater than said intermediate temperature Tw1. Both the first determinate coolant temperature value TF1 and the second determinate coolant temperature value TF2 are set to be substantially lower than the maximum temperature value Tw2, exemplarily 118° C., acceptable to be reached by the coolant during the operation of the internal combustion engine. The first determinate coolant temperature value TF1 and the second determinate coolant temperature value TF2 are set discretionarily, depending upon the characteristics of the type of thermal wax selected for incorporation into the thermal actuator 46.

This preferred embodiment of the cooling fan coupling system of the present invention operates as follows.

First, when the vehicle in which the internal combustion engine with this shown cooling fan coupling system is fitted is operated in a normally loaded condition on a generally flat road surface, the temperature of the engine coolant is regulated by the opening and closing of the aforementioned coolant thermostat, not particularly shown. At this time, since the engine is not very heavily loaded, the temperature of the coolant does not rise to a value very much higher than the determinate temperature value Thw, exemplarily 92° C., at which said coolant thermostat is fully opened up. Accordingly, since the first determinate temperature Tf1 is substantially greater than said determinate temperature value Thw by the temperature amount $\delta T1$ (exemplarily 10° C.), the thermowax included in the thermal actuator 46 does not substantially expand, and thus said thermal actuator 46 does not substantially push via the first and second thrust rods 45 and 44 on the valve element 39. Accordingly by the force of the compression coil spring 47, the valve element 39 is definitely impelled against the partition plate 27, so as substantially completely closing of the second valve port 34. Meanwhile, by the operation as described above of the bimetallic spiral strip 43 in response to the temperature of the air passing through the vehicle radiator for cooling the coolant flowing therethrough, the valve element 39 is rotationally positioned to one or the other of its positions shown as "A" and "B" in FIG. 2, so as either to close or to open the first valve port 33. Thereby, the amount of fluid flow through the partition plate 27 between the fluid reservoir chamber 29 and the coupling operation chamber 28 is regulated between a substantially zero amount and an intermediate amount allowed only by the fully open valve port 33 by itself, and accordingly the amount of coupling between the rotor 30 and the assembly of the back plate 22 and the partition plate 27, i.e. between the pulley 1 and the cooling fan (not shown) for the internal combustion engine, provided by the circulation of fluid through the first and second labyrinthine passages 31c and 32c defined by the vanes 31a, 31b and 32a, 32b is varied between a minimum amount and an intermediate amount, hereinafter termed LOW and MIDDLE, and accordingly the rotational speed of said cooling fan for any particlar revolution speed of the engine crank shaft and the pulley 1 and the parts coupled thereto is controlled between a relatively low value and an intermediate value.

On the other hand, when the vehicle in which the internal combustion engine with this shown cooling fan coupling system is fitted comes to be operated in a heavily loaded condition or in a hilly or mountainous area, then it may come to pass that the regulation of the temperature of the engine coolant by the opening and closing of the aforementioned coolant thermostat (not shown) can no longer be accomplished properly. In other words, at this time, since the engine is now rather heavily loaded, the temperature of the coolant rises up to above the determinate temperature value Thw, exemplarily 92° C., at which said coolant thermostat is fully opened up. At this time, as explained above, the valve element 39 will already have been rotated by the action as described above of the bimetallic spiral strip 43 in response to the temperature of the air passing through the vehicle radiator for cooling the coolant flowing therethrough to its position shown as "B" in FIG. 2, so as to allow the amount of coupling between the rotor 30 and the assembly of the back plate 22 and the partition plate plate 27, i.e. between the pulley 1 and the cooling fan (not shown) for the internal combustion engine to be already at its intermediate amount MIDDLE. When the coolant temperature thus rises above the determinate temperature value Thw by the temperature amount $\delta T1$ (exemplarily 10° C.), it comes to exceed the first determinate temperature Tf1 relating to the thermal actuator 46, and the thermowax included in said thermal actuator 46 now expands, so that said thermal actuator 46 now pushes via the first and second thrust rods 45 and 44 in the axial direction on the valve element 39. Accordingly, against the force of the compression coil spring 47 which is overcome, said valve element 39 is pushed away from the partition plate 27, so as substantially completely to open the second valve port 34, as well as to confirm the opening of the first valve port 33. Thereby, the amount of fluid flow through the partition plate 27 between the fluid reservoir chamber 29 and the coupling operation chamber 28 is allowed to reach a maximum amount allowed by the fully opened valve ports 33 and 34 together, and accordingly the amount of coupling between the rotor 30 and the assembly of the back plate 22 and the partition plate 27, i.e. between the pulley 1 and the cooling fan not particularly shown for the internal combustion engine, provided by the circulation of fluid through the first and second labyrinthine passages 31c and 32c defined by the vanes 31a, 31b and 32a, 32b is increased to a maximum amount, hereinafter termed HIGH, and the rotational speed of said cooling fan for any particular revolution speed of the engine crank shaft and the pulley 1 and the parts coupled thereto is controlled so as to be maximized.

When thus the rotational speed of the cooling fan is maximized, the cooling capability of the radiator for the coolant flowing therethrough is of course concomitantly increased, which will be effective for causing the temperature of the coolant for the engine to become lowered down. Now, when the temperature of the coolant drops to below the second determinate temperature Tf2 relating to the thermal actuator 46, the thermowax included in the thermal actuator 46 now contracts, so that said thermal actuator 46 now ceases, via the first and second thrust rods 45 and 441 to push in the axial direction on the valve element 39. Accordingly now, by the biasing force of the compression coil spring 47, said valve element 39 is pushed towards the partition plate 27, so as substantially completely to close the second valve port 34, but not to close the first valve port 33 because of the action of the bimetallic spiral strip 43. Thereby, the amount of fluid flow through the partition plate 27 between the fluid reservoir chamber 29 and the coupling operation chamber 28 is reduced to its intermediate amount allowed only by the fully opened valve port 33 by itself, and accordingly the amount of coupling between the rotor 30 and the assembly of the back plate 22 and the partition plate 27, i.e. between the pulley 1 and the cooling fan for the internal combustion engine provided by the circulation of fluid through the first and second labyrinthine passages 31c and 32c, is decreased to its intermediate amount termed MIDDLE, and the rotational speed of said cooling fan for any particular revolution speed of the engine crank shaft and the pulley 1 and the parts coupled thereto is controlled to be intermediate. Thus, the system reverts to its initial operational mode as specified earlier. The hysteresis inherent in the operation of this system should be particularly noted: it is caused because the second determinate temperature Tf2 relating to the thermal actuator 46 is substantially lower than the first determinate temperature Tf1 thereof, i.e. because the amount δT1 (exemplarily 10° C.) by which said first determinate temperature value Tf1 relating to the thermal actuator 46 exceeds the intermediate opening temperature Tw1 for the coolant thermostat is substantially greater than the amount δT2 (exemplarily 5° C.) by which the second determinate temperature value Tf2 relating to said thermal actuator 46 exceeds said coolant thermostat intermediate opening temperature Tw1.

Thereby, according to the present invention as described above, the domains in which the second control valve for controlling the engine cooling fan is set to be open and closed are appropriately set according to and in view of the functional characteristics of the thermostatic valve for control of the engine coolant flow. Accordingly, driving of the cooling fan is appropriately carried out at all times and in all engine operational conditions, in response to the engine coolant temperature and in response to the temperature of the air flowing through the engine radiator, without causing any excess or deficiency of engine cooling. Thus, while when high cooling effect is required for the engine this engine cooling effect unequivocally activates the cooling fan at a high rotational speed, on the other hand such effect does not drive the cooling fan more than is required. Accordingly, this engine cooling fan coupling system maximizes engine output power and engine fuel consumption, while minimizing cooling fan noise.

Although the present invention has been shown and decribed in terms of the preferred embodiment thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the legitimate and properly interpreted scope of the accompanying claims, which follow.

What is claimed is:

1. A cooling fan coupling system for an engine for an automotive vehicle, said engine comprising a rotating member and a coolant circulation system comprising a coolant radiator, a cooling fan for propelling air past said radiator to cool said coolant radiator, and a thermostatic valve for controlling flow of coolant through said coolant radiator, said thermostatic valve being constituted to start to open at a first determinate coolant temperature value, to be fully opened at a second determinate coolant temperature value, and to be partly opened at a third determinate coolant temperature value which is intermediate said first determinate coolant temperature value and said second determinate coolant temperature value, said cooling fan coupling system comprising:

(a) a first member rotationally coupled to said rotating member of said engine;
   (b) a second member rotationally coupled to said cooling fan;
   (c) means for providing rotational coupling between said first member and said second member, the degree of said rotational coupling being lower when a first control valve is closed an higher when said first control valve is opened, and also being lower when a second control valve is closed an higher when said second control valve is opened;
   (d) means for opening said first control valve when the temperature of the air which is passing said radiator is higher than a determinate air temperature value, and for closing said first control valve when the temperature of the air which is passing said radiator is lower than said determinate air temperature value; and
   (e) means for opening said second control valve when engine coolant temperature rises from below a fourth determinate coolant temperature value to above said fourth determinate coolant temperature value, and for closing said second control valve when engine coolant temperature drops from above a fifth determinate coolant temperature value to below said fifth determinate coolant temperature value, said fifth determinate coolant temperature value being substantially lower than said fourth determinate coolant temperature value;
   (f) said fourth and fifth determinate coolant temperature values being substantially higher than said third determinate coolant temperature value, said fourth determinate coolant temperature value differing from said third determinate coolant temperature value by a first determinate temperature difference, and said fifth determinate coolant temperature value differing from said third determinate coolant temperature value by a second determinate temperature difference;
   (g) said first determinate temperature difference being substantially greater than said second determinate temperature difference; and
   (h) said fifth determinate coolant temperature value being higher than said second determinate coolant temperature value.

2. An engine cooling fan coupling system according to claim 1, wherein said rotational coupling between said first member and said second member is provided by the circulation of a working fluid, the degree of said circulation of said working fluid being controlled by said first control valve and also by said second control valve.

3. An engine cooling fan coupling system according to claim 2, wherein said first control valve and said second control valve are provided in parallel in the circulation path of said working fluid.

* * * * *